(12) United States Patent
Stewart et al.

(10) Patent No.: US 7,683,789 B2
(45) Date of Patent: Mar. 23, 2010

(54) COMPACT OMNI-DIRECTIONAL RF SYSTEM

(75) Inventors: Roger Green Stewart, Morgan Hill, CA (US); Jyn-Bang Shyu, Cupertino, CA (US)

(73) Assignee: Intelleflex Corporation, San Jose, CA (US)

( * ) Notice: Subject to any disclaimer, the term of this patent is extended or adjusted under 35 U.S.C. 154(b) by 517 days.

(21) Appl. No.: 11/073,239

(22) Filed: Mar. 4, 2005

(65) Prior Publication Data

US 2006/0208958 A1     Sep. 21, 2006

(51) Int. Cl.
*G08B 13/14* (2006.01)
(52) U.S. Cl. ............ 340/572.7; 340/10.1; 340/825.59; 340/568.1
(58) Field of Classification Search ............ 340/572.7, 340/10.1, 572.1, 540, 568.1, 10, 572.5, 572.8, 340/825, 825.49, 10.4, 10.5, 825.59; 235/462.46, 235/462.01; 342/463, 465, 350, 450; 343/700 R, 343/867; 455/41.1, 39
See application file for complete search history.

(56) References Cited

U.S. PATENT DOCUMENTS

| | | | | |
|---|---|---|---|---|
| 4,278,978 A * | 7/1981 | Frosch et al. | ............... | 342/383 |
| 4,734,701 A * | 3/1988 | Grobert | ............... | 342/380 |
| 5,469,470 A * | 11/1995 | Takahashi | ............... | 375/142 |
| 5,942,977 A * | 8/1999 | Palmer et al. | ............... | 340/572.5 |
| 6,088,581 A * | 7/2000 | Bickley et al. | ............... | 455/131 |
| 6,118,379 A | 9/2000 | Kodukula et al. | ............... | 340/572.8 |
| 6,147,606 A | 11/2000 | Duan | ............... | 340/572.7 |
| 6,154,661 A * | 11/2000 | Goldburg | ............... | 455/562.1 |
| 6,184,841 B1 | 2/2001 | Shober et al. | ............... | 343/853 |
| 6,204,825 B1 | 3/2001 | Wilz | ............... | 343/841 |
| 6,236,314 B1 | 5/2001 | Smith et al. | ............... | 340/572.7 |
| 6,278,369 B2 | 8/2001 | Smith et al. | ............... | 340/572.7 |
| 6,294,953 B1 * | 9/2001 | Steeves | ............... | 329/341 |
| 6,329,949 B1 | 12/2001 | Barnett et al. | ............... | 343/700 |
| 6,400,761 B1 * | 6/2002 | Smee et al. | ............... | 375/232 |
| 6,417,816 B2 | 7/2002 | Sadler et al. | ............... | 343/795 |
| 6,448,926 B1 * | 9/2002 | Weinberg et al. | ............... | 342/357.06 |
| 6,452,549 B1 | 9/2002 | Lo | ............... | 343/700 MS |
| 6,539,207 B1 | 3/2003 | del Castillo et al. | ............... | 455/90.3 |
| 6,593,845 B1 * | 7/2003 | Friedman et al. | ............... | 340/10.33 |
| 6,650,302 B2 | 11/2003 | Sanad | ............... | 343/841 |
| 6,677,852 B1 * | 1/2004 | Landt | ............... | 340/10.1 |
| 6,725,014 B1 * | 4/2004 | Voegele | ............... | 455/41.2 |
| 6,847,808 B2 | 1/2005 | Zhou | ............... | 455/189.1 |
| 6,980,789 B2 | 12/2005 | Lin | ............... | 455/403 |
| 7,020,444 B2 * | 3/2006 | Shinbo et al. | ............... | 455/76 |
| 7,082,171 B1 * | 7/2006 | Johnson et al. | ............... | 375/316 |
| 2001/0000430 A1 | 4/2001 | Smith et al. | ............... | 340/572.1 |
| 2002/0000940 A1 | 1/2002 | Moren et al. | ............... | 343/702 |

(Continued)

OTHER PUBLICATIONS

International Search Report of related Foreign application No. PCT/US06/07707 which was mailed on Aug. 25, 2006.

(Continued)

*Primary Examiner*—Daniel Previl
(74) *Attorney, Agent, or Firm*—Zilka-Kotab, PC

(57) ABSTRACT

A radio frequency circuit for summing signals from multiple lobes of an antenna includes circuitry for converting RF signals from lobes of an antenna to baseband signals, and circuitry for summing the baseband signals from the lobes of an antenna.

17 Claims, 9 Drawing Sheets

U.S. PATENT DOCUMENTS

| | | | |
|---|---|---|---|
| 2002/0067267 A1* | 6/2002 | Kirkham | 340/572.7 |
| 2002/0122010 A1 | 9/2002 | McCorkle | 343/767 |
| 2003/0011525 A1 | 1/2003 | Sanad | 343/702 |
| 2003/0058168 A1 | 3/2003 | Sadler et al. | 343/700 MS |
| 2003/0137458 A1 | 7/2003 | Troelsen | 343/702 |
| 2005/0206564 A1* | 9/2005 | Mao et al. | 342/377 |

OTHER PUBLICATIONS

The International Preliminary Examination Report from PCT application No. PCT/US06/07707 mailed Mar. 15, 2007.

* cited by examiner

COMPACT OMNI-DIRECTIONAL RF SYSTEM

FIELD OF THE INVENTION

The present invention relates to RFID tags, and more particularly, this invention relates to implementation of circuitry on an omnidirectional antenna.

BACKGROUND OF THE INVENTION

RFID technology employs a radio frequency ("RF") wireless link and ultra-small embedded computer circuitry. RFID technology allows physical objects to be identified and tracked via these wireless "tags". It functions like a bar code that communicates to the reader automatically without requiring manual line-of-sight scanning or singulation of the objects. RFID promises to radically transform the retail, pharmaceutical, military, and transportation industries.

Several advantages of RFID technology are summarized in Table 1:

TABLE 1

| |
| --- |
| Identification without visual contact |
| Able to read/write |
| Able to store information in tag |
| Information can be renewed anytime |
| Unique item identification |
| Can withstand harsh environment |
| Reusable |
| High Flexibility/Value |

As shown in FIG. 1, an RFID system 100 includes a tag 102, a reader 104, and an optional server 106. The tag 102 includes an IC chip and an antenna. The IC chip includes a digital decoder needed to execute the computer commands the tag 102 receives from the tag reader 104. The IC chip also includes a power supply circuit to extract and regulate power from the RF reader; a detector to decode signals from the reader; a transmitter to send data back to the reader; anti-collision protocol circuits; and at least enough EEPROM memory to store its EPC code.

Communication begins with a reader 104 sending out signals to find the tag 102. When the radio wave hits the tag 102 and the tag 102 recognizes the reader's signal, the reader 104 decodes the data programmed into the tag 102. The information is then passed to a server 106 for processing. By tagging a variety of items, information about the nature and location of goods can be known instantly and automatically.

The system uses reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1

Identity tags (RF user programmable, maximum range 3 m)

Lowest cost (AIDC Targets: 5¢ moving down to 2¢ in trillion-unit/yr volumes)

Class-2

Memory tags (8 bits to 128 Mbits programmable at maximum 3 m range)

Security & privacy protection

Low cost (AIDC Targets: typically 10¢ at billion-unit volumes)

Class-3

Battery tags (256 bits to 64 Kb)

Self-Powered Backscatter (internal clock, sensor interface support)

100 meter range

Moderate cost (Targets: $50 currently, $5 in 2 years, 20¢ at billion-unit volumes)

Class-4

Active tags

Active transmission (permits tag-speaks-first operating modes)

Up to 30,000 meter range

Higher cost (Targets: $10 in 2 years, 30¢ in billion-unit volumes)

In RFID systems where passive receivers (i.e., Class-1 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

In the design of RF antennas, it is often desirable to achieve an antenna gain pattern that is independent of orientation in any direction, i.e., fully spherical in all three dimensions. Most single antenna designs suffer from attenuation in at least one direction. This usually results in greater difficulties during installations, and reduced reliability over changing environmental conditions. Some solutions have included using multiple antenna and transceiver hardware systems to more completely cover all orientations of the desired signals. These solutions are more costly, and physically larger, due to the requirement of duplicating the transceiver electronics. Other systems have utilized a switched approach where the antenna with the greatest signal is chosen. This requires complex switching electronics and intelligence to properly select the greatest signal.

Therefore, it would be desirable to create an RF design that exhibits the greatest gain, while maintaining a fully omnidirectional (spherical) pattern. It would also be desirable to do so with the fewest, smallest, lowest cost circuitry.

In conjunction with the desire for orientation-independent functionality, it is also desirable to miniaturize the entire transceiver. However, miniaturization urges physical positioning of all of the electronic components near the antenna. The location of conducting elements within the field of the antenna has heretofore generally resulted in the antenna's characteristics being modified, usually in an undesirable fashion. This has been dealt with previously by simply accepting the degraded performance, or by physically separating the antenna from other conductive elements, resulting in an undesirably larger size.

Ideally, the electronics would be positioned adjacent the antenna such that the antenna acts as a virtual ground plane to replace what would otherwise be a printed circuit board. However, prior art antennas tend to be long, thin, and open. The problem is that because of the inductance, these antennas are unsuitable for use as a ground plane as the voltage potentials are different in different portions of the antenna. Because the antenna inductance level is quite different than the circuit, the electronics will exhibit undesirable behavior. For instance, a carrier at 900 MHz represents a different instantaneous voltage at various points on the antenna, so use of different parts of the antenna as the same ground plane would result in different behavior at different times.

What is therefore needed is a way to reduce physical side of the RF device while maintaining optimal antenna characteristics.

SUMMARY OF THE INVENTION

The present invention provides the desirous advantages described above by providing a radio frequency (RF) system having omnidirectional functionality in a very compact design. By orienting lobes of an antenna generally perpendicular to each other, and adding their responses at baseband after demodulation, a nearly perfectly spherical antenna gain is achieved. This requires only a second detector subcircuit, rather than an entire second transceiver. Further, by locating the electronic components of the receiver within the physical area of the antenna, undesired interactions with the antenna's electromagnetic fields are successfully avoided. This is because the circuitry resides over an area of the antenna, from which the electromagnetic waves are launched and absorbed by the antenna structure, and thus "see" only the integrated antenna/ground plane structure, and therefore are substantially unmodified by the presence of the circuitry.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
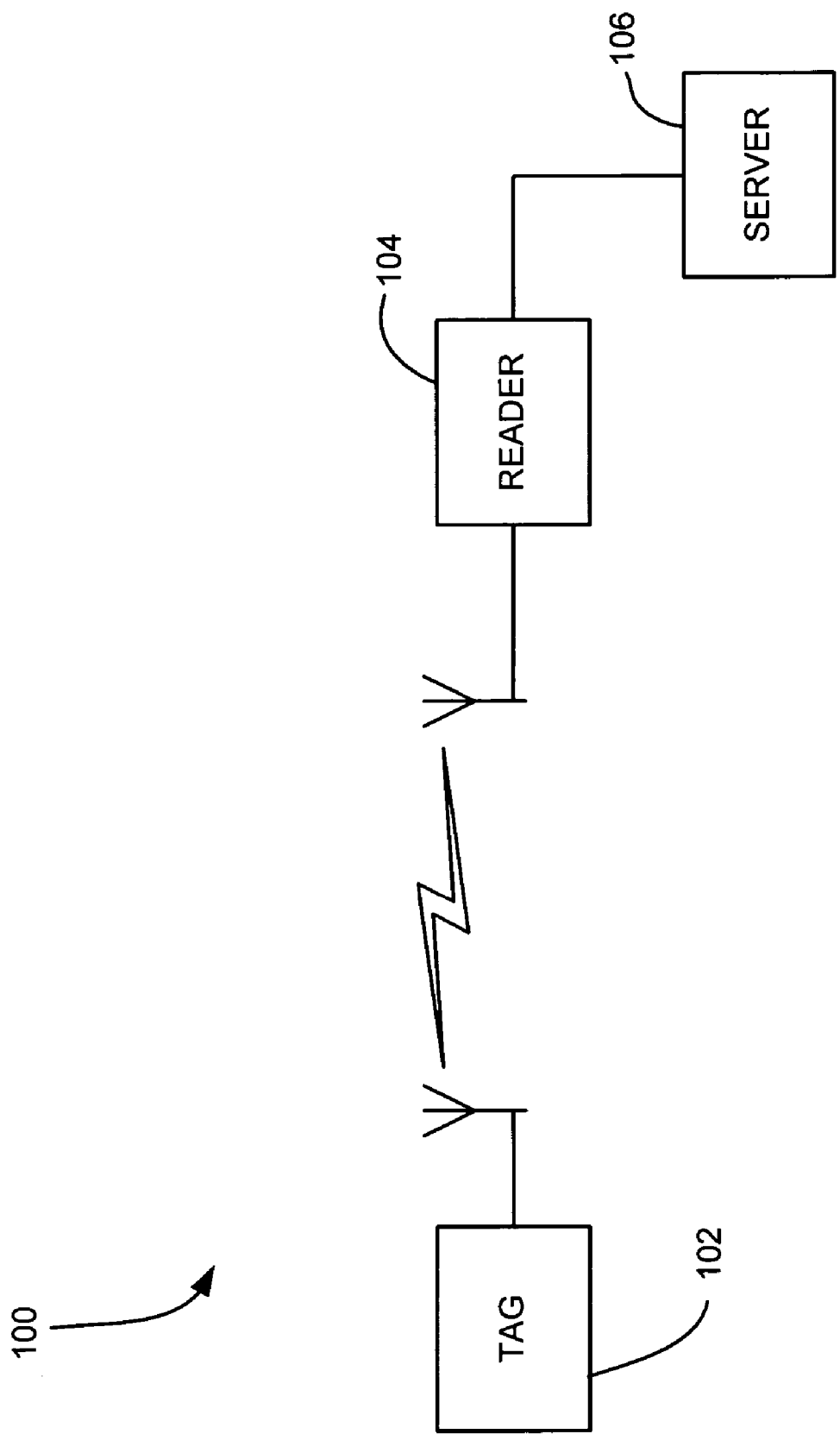
FIG. 1 is a system diagram of an RFID system.
Figure 2:
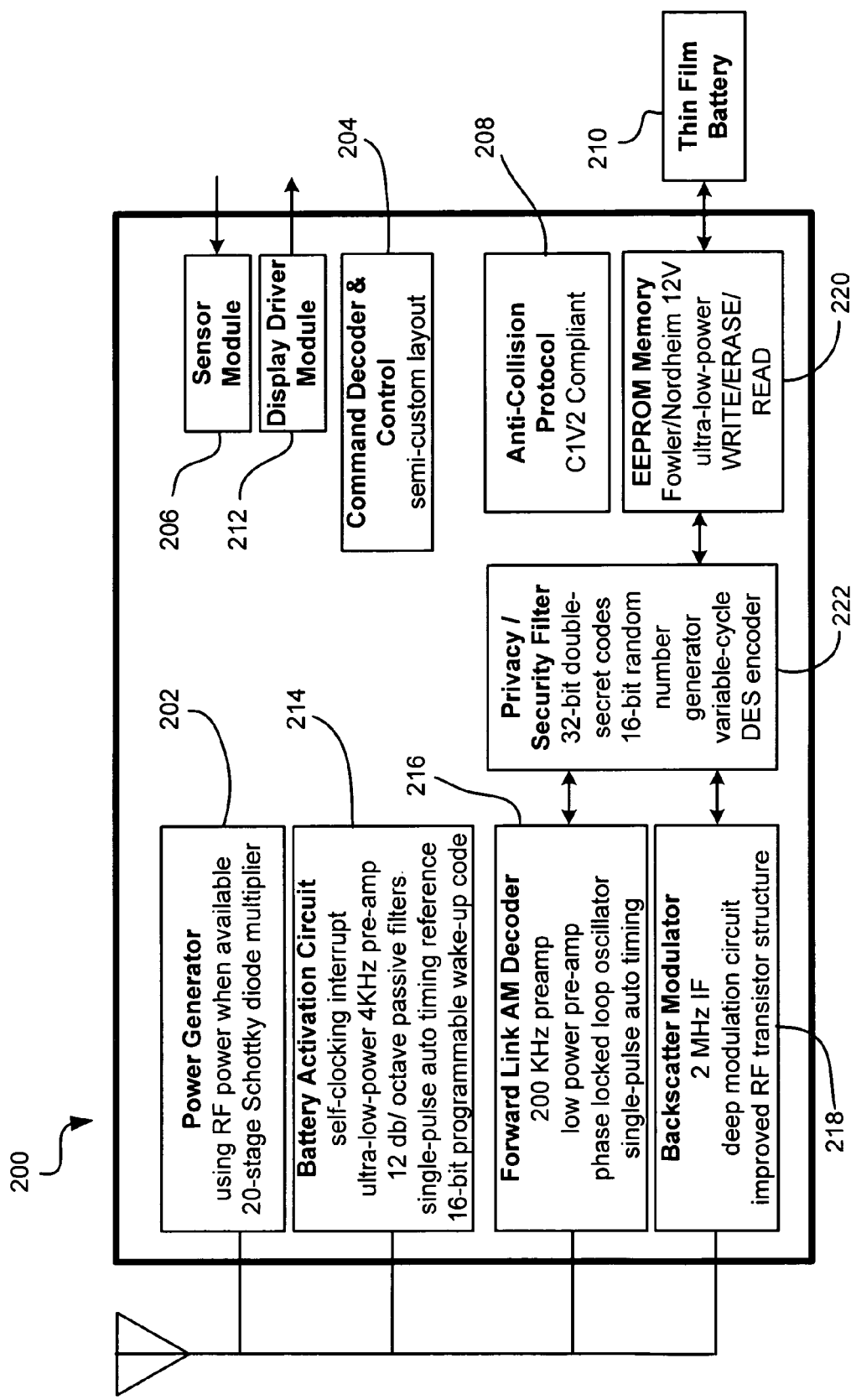
FIG. 2 is a system diagram for an integrated circuit (IC) chip for implementation in an RFID tag.

The present invention is preferably implemented in a Class-3 or higher Class tag, but will function with any type of module or class of RFID tag. FIG. 2 depicts a circuit layout of a Class-3 module 200 according to a preferred embodiment for implementation in an RFID tag, and is presented by way of example only. This Class-3 module can form the core of RFID modules appropriate for many applications such as identification of pallets, cartons, containers, vehicles, or anything where a range of more than 3 meters is desired. As shown, the module 200 includes several industry-standard circuits including a power generation and regulation circuit 202, a digital command decoder and control circuit 204, a sensor interface module 206, a C1V2 interface protocol circuit 208, and a power source (battery) 210. A display driver module 212 can be added to drive a display.

A battery activation circuit 214 is also present to act as a wake-up trigger. The battery activation circuit 214 includes with an ultra-low-power, narrow-bandwidth preamplifier. The battery activation circuit 214 also includes a self-clocking interrupt circuit and may use an innovative 32-bit user-programmable digital wake-up code as described in U.S. patent application Ser. No. entitled "BATTERY ACTIVATION CIRCUIT" and having Ser. No. 11/007,973, filed on Dec. 8, 2004, and which is herein incorporated by reference. The battery activation circuit 214 draws less power during its sleeping state and is much better protected against both accidental and malicious false wake-up trigger events that otherwise would lead to pre-mature exhaustion of the Class-3 tag battery 210.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A pure, Fowler-Nordheim direct-tunneling-through-oxide mechanism 220 is present to reduce both the WRITE and ERASE currents to less than 0.1 μA/cell in the EEPROM memory array. This will permit designing of tags to operate at maximum range even when WRITE and ERASE operations are being performed.

The module 200 also incorporates a highly-simplified, yet very effective, security encryption circuit 222 as described in U.S. patent application Ser. No. entitled "SECURITY SYSTEM AND METHOD" and having Ser. No. 10/902,683, filed on Jul. 28, 2004 and which is herein incorporated by reference.

Sensors to monitor temperature, shock, tampering, etc. can be added by appending an industry-standard I2C interface to the core chip.

Extremely low-cost Class-2 security devices can be built by simply disabling or removing the wake-up module, preamplifiers, and IF modules from the Class-3 module core.

Figure 3:
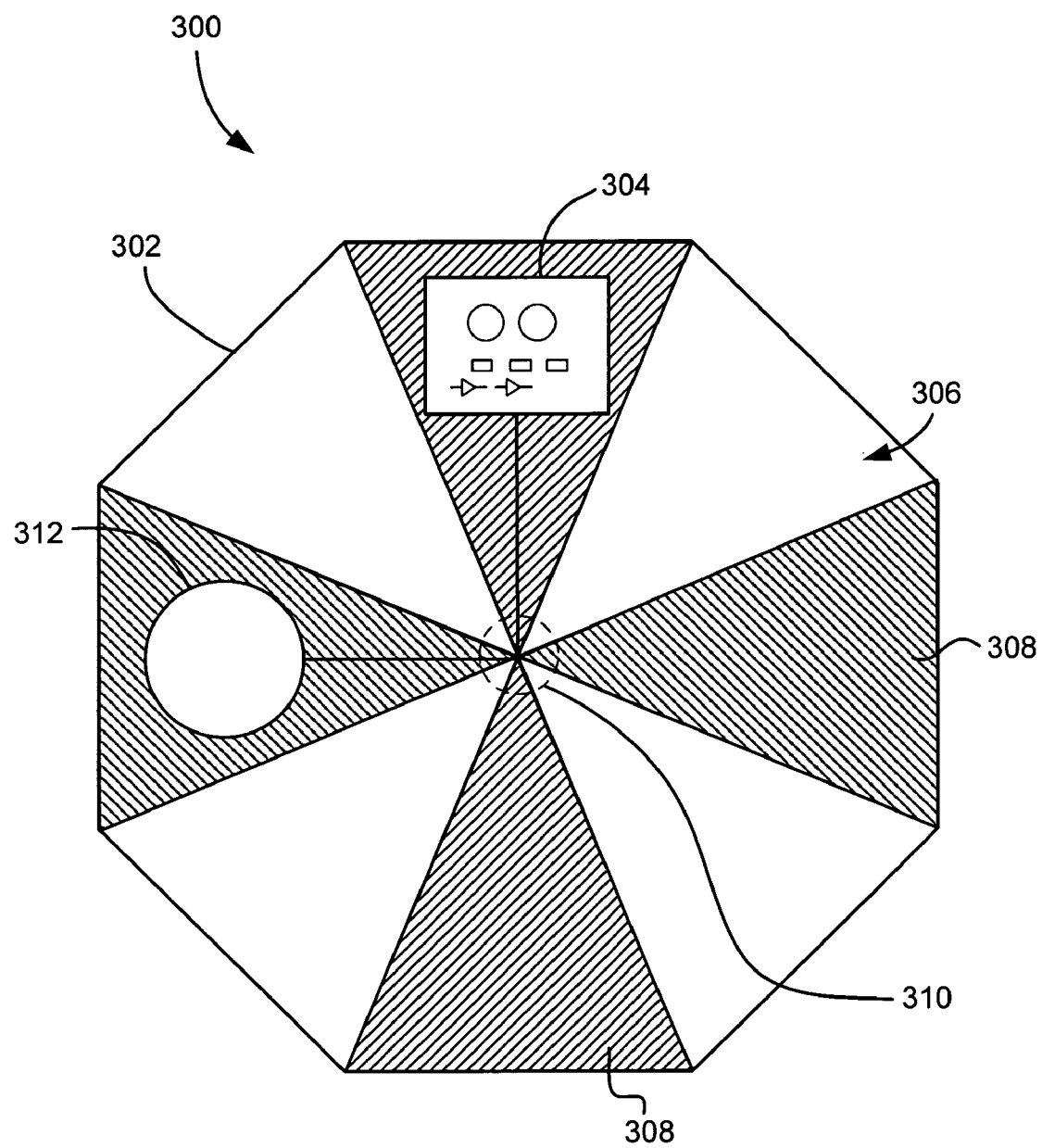
FIG. 3 is a side view of an RFID tag according to one embodiment.

FIG. 3 depicts an RFID system 300 (e.g., tag) having omnidirectional functionality. The system includes a supporting substrate 302, e.g., board or flexible substrate that supports and protects the various components of the system 300. The substrate 302 is preferably be made of an electrically insulative material, such as materials typically used to make layers of printed circuit boards (PCBs).

A circuit 304 is coupled to the substrate 302. The circuit 304 can include some or all of the components described above in relation to the module 200 of FIG. 2, and can include others not described above. An antenna 306 of conventional materials is coupled to the substrate and operatively coupled to the circuit 304. The antenna 306 includes a carrier layer and, in some embodiments, a ground plane. As shown, the antenna 306 has multiple lobes 308 oriented to create a generally perpendicular, or cross-shaped, antenna design. Each lobe 308 is preferably positioned on a different plane of the substrate 302 to electrically isolate the lobes 308 from each other. Thus, the lobes 308 operate independently of each other at RF. The resultant signal generated in the various lobes are captured and rectified, and the rectified outputs of each are combined at basebands. Whichever signal is highest will dominate at the envelope. Thus, this is an improvement over attempting to add the RF signals directly, as adding the RF signals directly will result in some orientation and/or frequency where there is a null.

By orienting lobes 308 of the antenna 306 generally perpendicular to each other, and adding their responses at baseband after demodulation, a nearly perfectly spherical antenna gain is achieved. This requires only a second detector subcircuit to demodulate (rectify) the responses from each lobe 308, rather than an entire second transceiver. A similar result can be obtained in designs of 3, 5, etc. lobes oriented in a generally equidistant spaced array. An example of a circuit to add antenna responses at baseband after demodulation is described in detail below.

As shown in FIG. 3, the antenna 306 contains two bow tie-shaped lobes 308, each lobe 308 crossing the other and having opposing triangular shaped regions. The term "antenna" as used herein generally refers to the overall antenna 306 structure. Accordingly, this design can also be thought of as two individual sub-antennas 306, each sub-antenna having two lobes 308 for a total of four triangular shaped lobes 308. This design can further be thought of as four triangular shaped lobes 308, where opposing pairs of the lobes 308 are electrically connected. Indeed, all embodiments described herein should be interpreted in the broadest sense possible.

Note also that the triangular lobes 308 can be interconnected differently than described above. For instance, either two adjacent lobes 308 can be coupled together; or three lobes 308 can be coupled together, with the fourth lobe 308 being electrically isolated to form a virtual ground plane as discussed below.

A variation of the antenna 306 shown in FIG. 3 would have four triangular-shaped lobes 308, each electrically isolated from the others, and having the same general shape. Each lobe 308 extends from a connecting region 310 of the substrate 302, so called because this is the preferred area where the leads of the lobes 308 traverse the layers of the substrate 302 e.g., board or flexible substrate to connect to the circuit 304.

The antenna 306 shape shown in FIG. 3 is preferred, as it provides the maximum omnidirectional receiving capabilities, while minimizing the perimeter to substrate area ratio.

Figure 4:
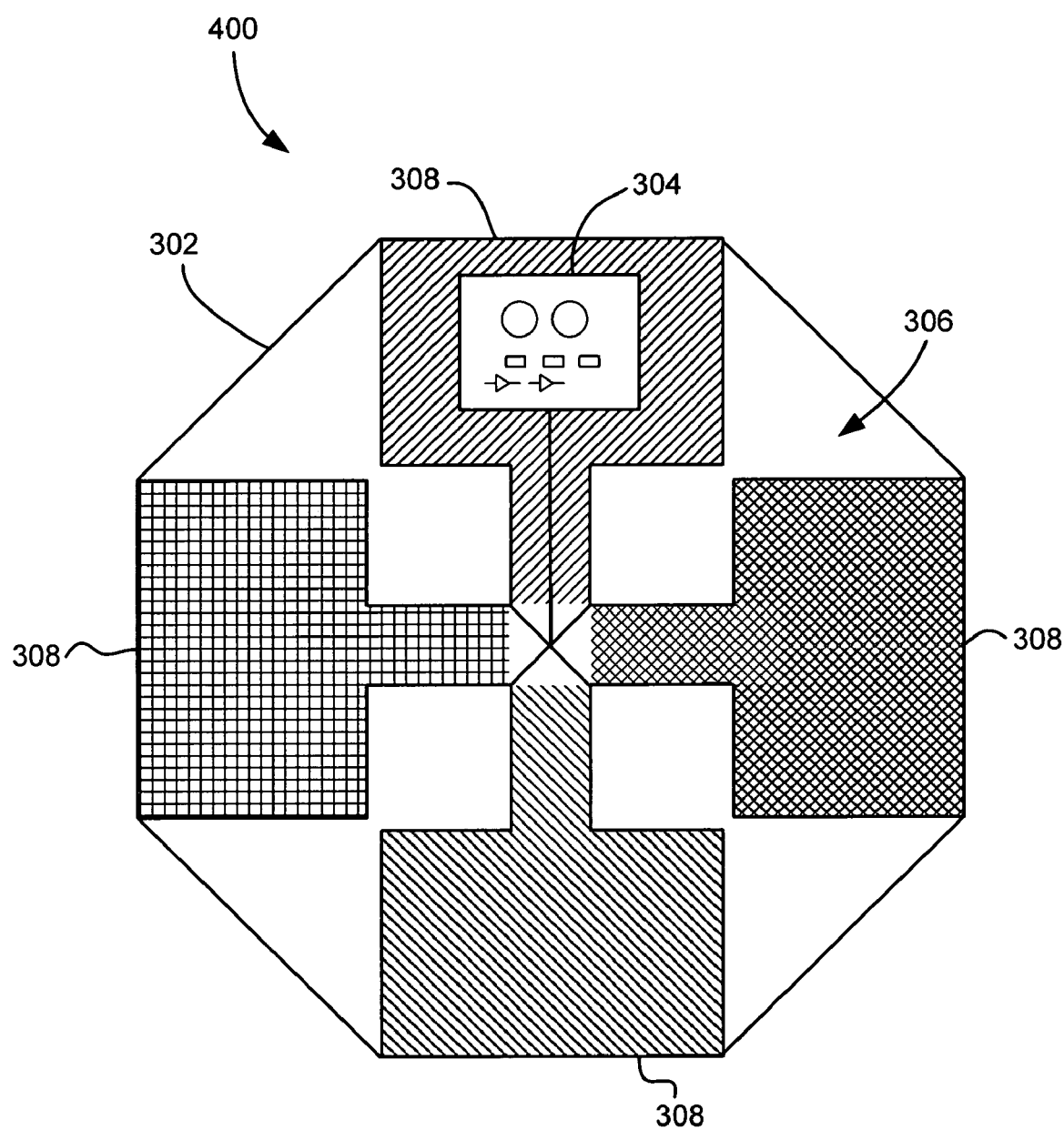
FIG. 4 is a side view of an RFID tag according to another embodiment.
Figure 5:
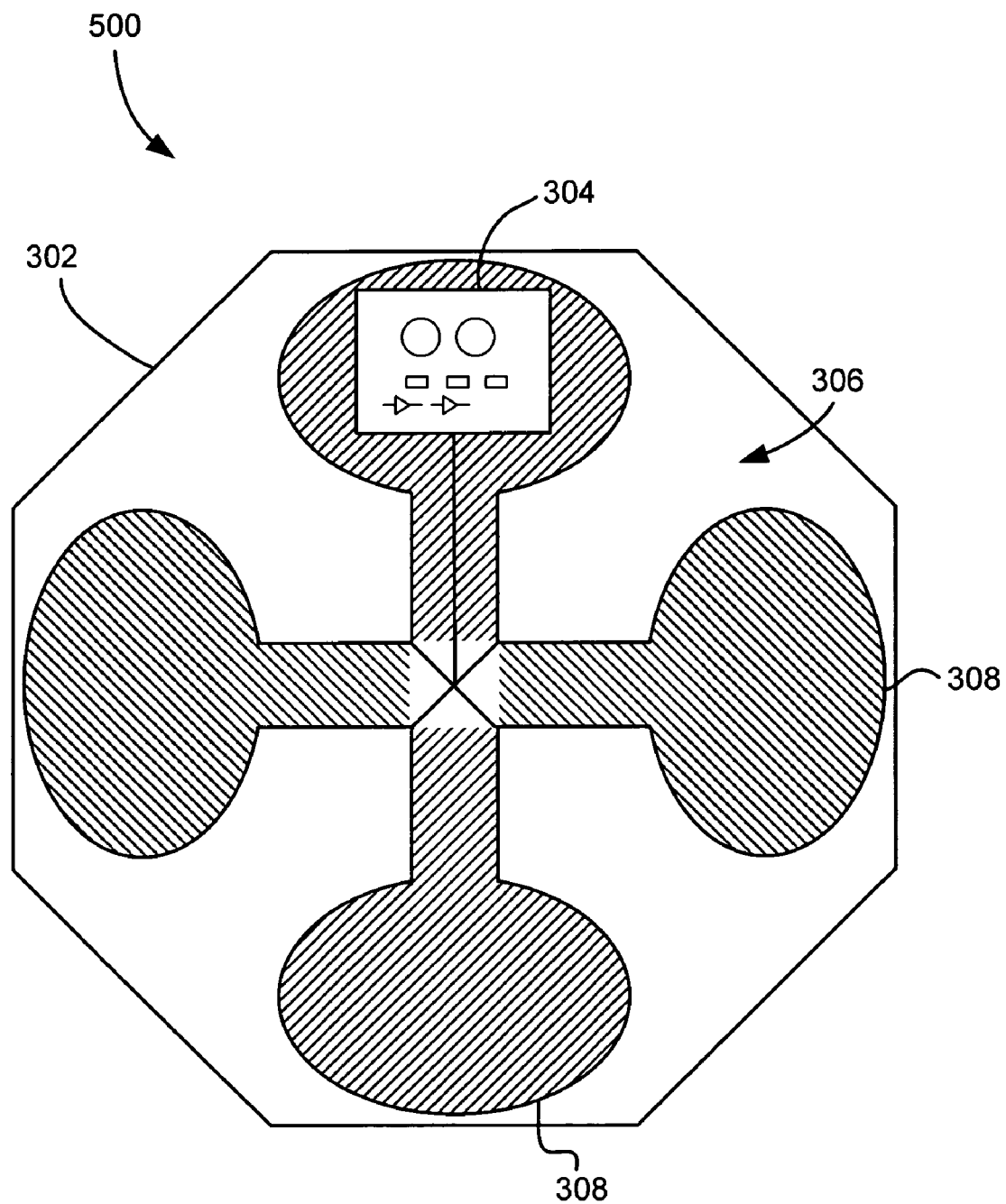
FIG. 5 is a side view of an RFID tag according to yet another embodiment.

Other antenna shapes are contemplated within the purview of the present invention. For instance, in the embodiment 400 shown in FIG. 4, the lobes 308 can have a generally rectangular shape. FIG. 4 also illustrates an embodiment having four individual lobes 308. FIG. 5 illustrates another variation 500 in which the lobes 308 have rounded regions. Other designs can include polygonal shapes, combinations of the foregoing, etc.

It must also be pointed out that the number of lobes 308 can vary. The designs already described have two, three and four lobes 308. However, nothing would prevent implementation of five or more lobes 308.

As mentioned above, by adding the antenna signals together at baseband after demodulation, a nearly perfectly spherical antenna gain is achieved.

Figure 6:
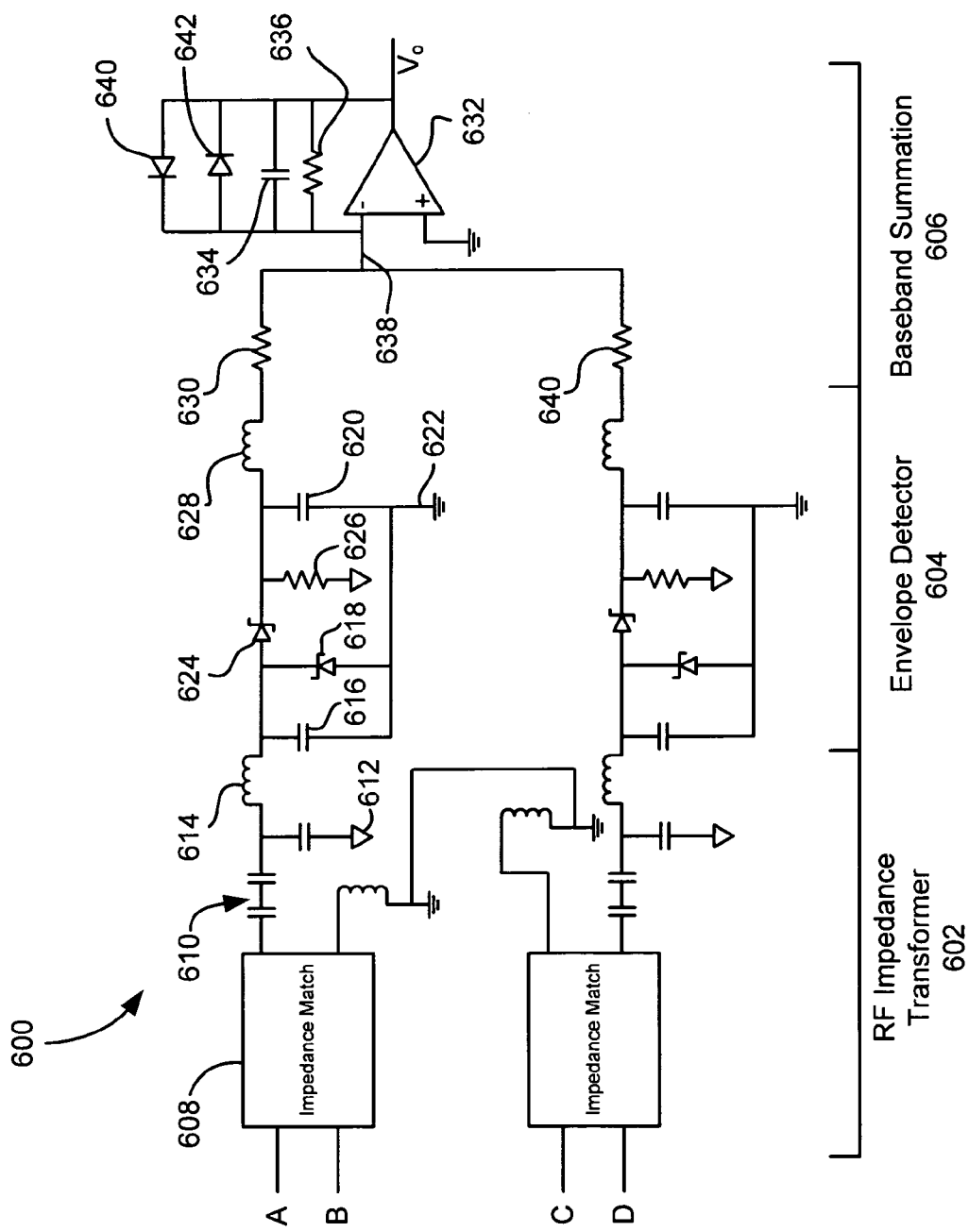
FIG. 6 illustrates an exemplary circuit that adds two antenna signals at baseband after demodulation.

FIG. 6 illustrates an exemplary circuit 600 that adds two antenna signals at baseband after demodulation. The first signal includes the input from lobes A and B of the antenna. The second signal includes input from lobes C and D of the antenna. This circuit provides true selection of the strongest signal. As shown, the circuit includes an RF impedance transformer section 602; an envelope detector section 604, which converts the RF signal to baseband; and a baseband summation circuit 606 where the processed antenna signals are added together at baseband after demodulation.

For simplicity, the signal path associated with lobes A and B will be described. With continued reference to FIG. 6, input from lobes A and B passes into impedance conversion module 608. The signal then passes to an AC coupler 610. A reference voltage is applied at module 612. The signal passes through an inductor 614 which normalizes the signal. Preferably, each lobe is inductively isolated from the others by inductors that are used to insure that, at the carrier frequency, e.g., 900 MHz, each lobe functions independently of the others.

The envelope detector section 604 includes a first capacitor 616, a first Schotky diode 618 or other rectifying device, and a second capacitor 620 all coupled to a common ground 622. When the signal is low, a charge is stored in the first capacitor 616. When the signal is high, the energy is sent to the signal flow path to enhance the signal pulses. The signal passes through a second Schotky diode 624. A resistor 626 works in conjunction with the second capacitor 620 to together act as a filter.

The signal, now converted from RF to baseband, then passes through an inductor 628 that further filters the signal. The signal then passes through a resistor 630. The processed signal from lobes A and B is combined with the processed signal from lobes C and D and input into the negative node of an amplifier (e.g., op amp) 632, which together with the surrounding circuitry creates an adder. The adder provides gain and sums the signals. A capacitor 634 and resistor 636 on a feedback loop enhance and filter the signal, which is sent to the tag as an output voltage ($V_o$). The baseband summation portion 606 of the circuit 600 provide summing, not averaging by inputting the signals into the negative node of the amplifier 632. The adder circuit (including adder and feedback loops) will keep the voltage at the input line 638 at a predetermined value, say 0V. If, for example the input from antenna nodes A and B at resistor 630 are 1V, this causes a 1 mA current to flow to the input line 638. If the input from antenna nodes C and D at resistor 640 are 1.5V, this causes a 1.5 mA current to flow to the input line 638. The total current at the input line 638 is 2.5 mA. The adder circuit then matches that current by outputting −2.5V, which keeps the voltage at the input line 638 constant at about 0V.

The op amp 632 has a very high gain if there is no negative feedback from its output back to its input. In normal operation, the signal travels through the two resistors 630, 636. If, for example, the signal passing through resistor 636 is 10 times higher than that traveling through resistor 630, the circuit will have a gain of 11 (10 through resistor 636 plus 1 through resistor 630). The capacitor 634 in the feedback loop acts as a low pass filter to remove high frequencies. To further improve the signal, a nonlinear device can be added to the feedback loop, such as back to back diodes 640, 642. This provides automatic gain control, which is important as it is desirable to minimize feedback excursion at node 638. This improves recovery time in instances where the signal strength at node 638 varies from one moment to the next, e.g., very high to very low. Feedback limits excursion at node 638, e.g., to 0.4/A+1, typically less than 40 mV, which prevents turning on any diodes when node 638 goes negative.

Additionally, the back to back diodes 640, 642 have been found to avoid forward biasing of the signal $V_o$. Forward biasing can affect diodes on the chip receiving the signal $V_o$ from the amp 632, causing malfunction and even failure.

Because the baseband summation portion of the circuit performs summing, not averaging, the inventors have found that about a 6 dB gain can be achieved over a scenario in which the signals are merely averaged.

Figure 7:
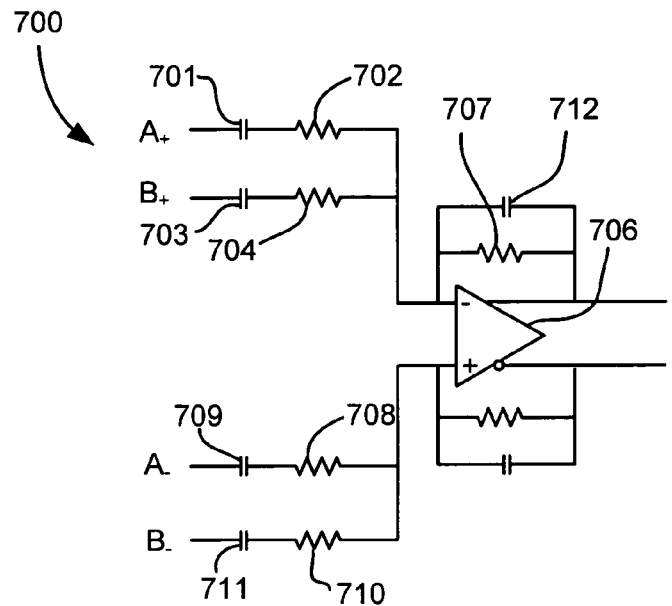
FIG. 7 illustrates an exemplary circuit for creating a differential input two antenna signals.

FIG. 7 depicts a variation on the above, where the circuit 700 creates a differential input into the baseband summation circuit 606 of FIG. 6. Referring to FIG. 7, for simplicity, inputs from antenna lobes A and B are shown, where lobes A and B are orthogonal to each other (e.g., bowtie-shaped lobes). As shown, the positive baseband signals from lobes A and B pass through capacitors 701, 703 that function as high pass filters (e.g., filter out 2 kHz and lower signal). The signal then passes through resistors 702, 704 and are input into a negative pole of an op amplifier 706. A resistor 707 on a feedback loop filters the signal, while a capacitor 712 (e.g., set at 40 kHz) provide low pass filtering as well as summation and amplification functions, as described in more detail below. Similarly, the negative baseband outputs from lobes A and B pass through capacitors 709, 711 and resistors 708, 710 and are input into a positive pole of the amplifier 706. The negative signal generally represents an inverted version of the positive signal, i.e., 180° phase change from the positive signal. The negative signal is processed in a similar way as the positive signal. By capturing both the positive and negative outputs of the lobes of the antenna, a differential output is obtained. The net result is better common mode rejection and stronger signal. As is well known, it is very hard to ignore noise in a single-ended input. Because of the nature of the antenna, the signal will be noisy. However, in the differential input described herein, the noise tends to couple together when the treatment of the positive and negative signals is symmetrical. Because the noise is the same on both sides, it cancels. The inventors have found that an additional 6 dB gain can be achieved using the circuit 700 of FIG. 7 in addition to the aforementioned reduced noise vulnerability.

Figure 8:
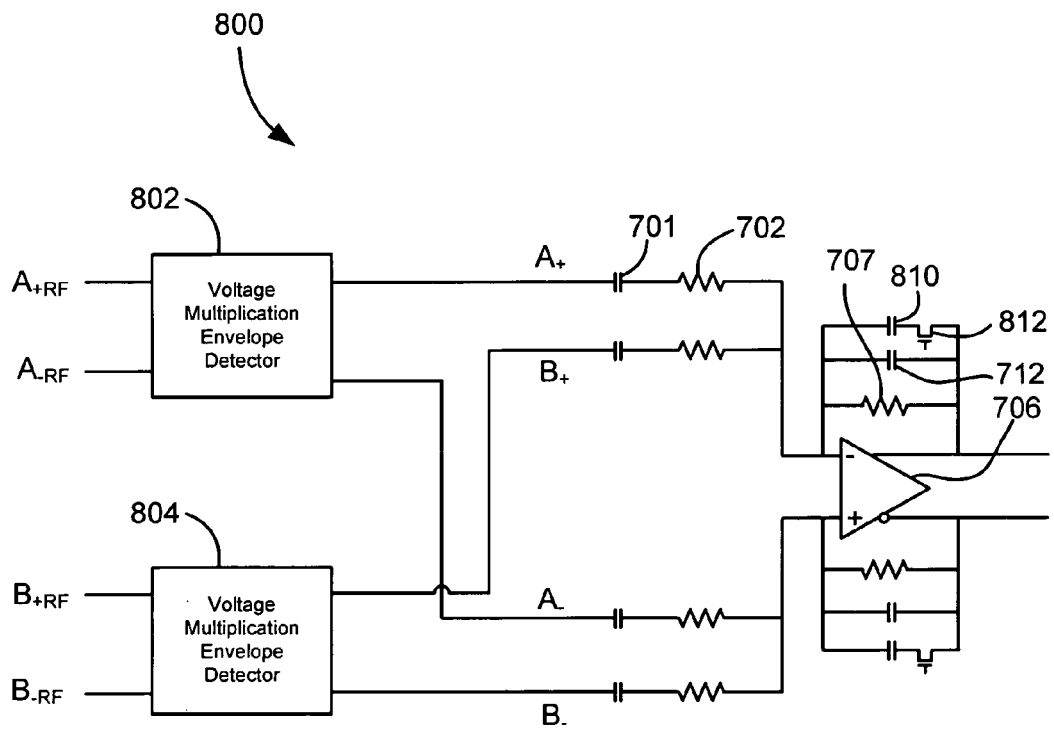
FIG. 8 illustrates a variation of the circuit of FIG. 7, where the circuit includes a multistage multiplier.

FIG. 8 illustrates a variation of the circuit of FIG. 7, where the circuit 800 now includes a multistage multiplier scheme comprising several stages of voltage multipliers. (See FIGS. 9 and 10 for examples of voltage multipliers.) As shown in FIG. 8, the positive and negative outputs from lobe A are input into a voltage multiplication envelope detector 802 which functions as a voltage multiplier to enhance the positive and negative signals while converting them to baseband. Similarly, the positive and negative outputs from lobe B are input into a second voltage multiplication envelope detector 804. The signal after conversion from RF to baseband is much less than the RF signal, typically on the order of 10%. However, by using multiple stages of voltage multiplication envelope detectors, the resultant baseband signal is much stronger. The inventors have found that an additional 12 dB gain can be achieved by adding the voltage multiplication envelope detectors 802, 804 in the configuration shown.

Again, high and low pass filtering is provided. As mentioned above, capacitors 701, 703, 709, 711 on the inputs provide high pass filtering, while capacitors 712 on the outputs provide low pass filtering. In FIG. 8, note that a second capacitor 810 and switch 812 have been added to each side feedback loop adjacent the op amp 706 to provide selectable low pass filtering. The second capacitor 810 in this embodiment is 5× (e.g., 8 kHz) the first capacitor 712 (e.g., 40 kHz). In low power mode, the capacitors 712, 810 are both active (switch 812 is on). This allows, for example, an activate or "wake up" command to be received and passed through to an activate circuit such as that described in copending U.S. patent application Ser. No. entitled "BATTERY ACTIVATION CIRCUIT" referenced above. In normal operating mode, the switch 812 is opened and the low pass filtering, e.g., at 40 kHz, is provided by the first capacitor 712.

A variation on the above is to control a bias voltage into the op amp 706. As will be appreciated by one skilled in the art, the speed at which the op amp 706 operates can be controlled by manipulating a bias voltage input thereto (bias voltage line not shown).

Figure 11:
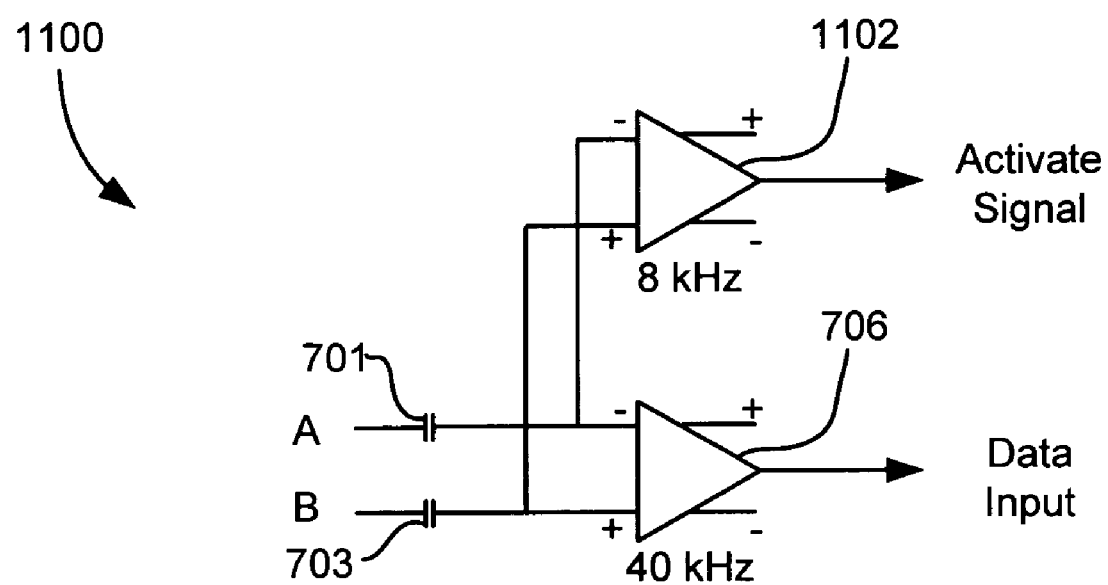
FIG. 11 illustrates a circuit for band selection according to another embodiment.

A further variation to provide selectable band pass filtering is shown in the circuit 1100 of FIG. 11. As shown, two op amps 706 and 1102 are shown. Continuing with the example of 8 kHz and 40 kHz, the first op amp 706 is set at 40 kHz, and is selectively turned on or off. The second op amp 1102 is set at 8 kHz for receiving the activate command. The second op amp 1102 is always running. These preamps are preferably AC coupled with internal bias, with a time constant of about 2-4 ms. This allows the circuit to self-adjust for variations in the reader signal strength and account for noise, as described in copending U.S. patent application Ser. No. "BATTERY ACTIVATION CIRCUIT" referenced above.

One skilled in the art will appreciate that other methods of providing band pass filtering can be used, and as such, the invention is not to be limited to the exemplary designs presented herein.

Figure 9:
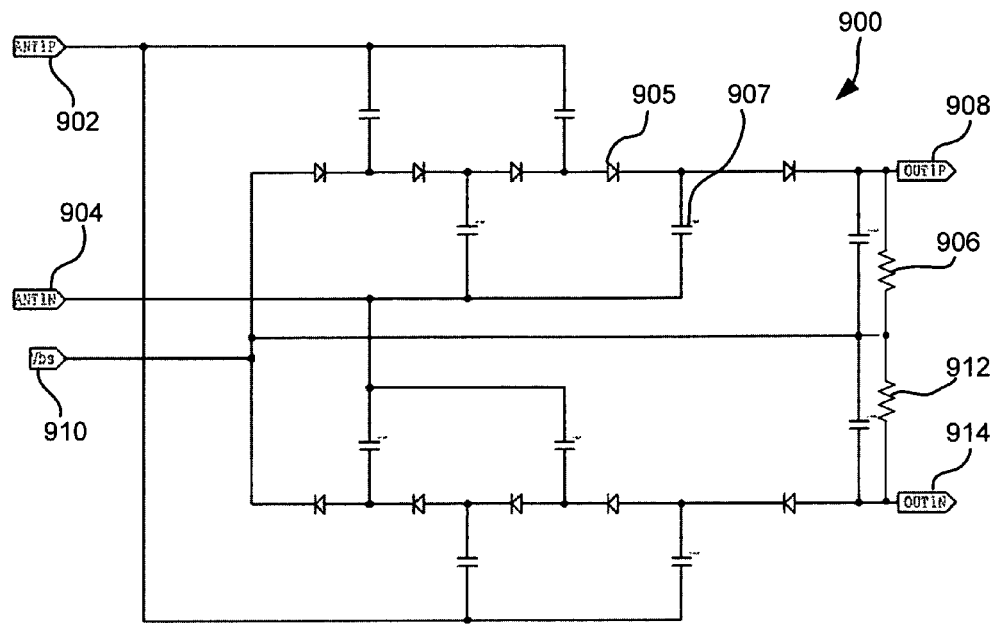
FIG. 9 illustrates a multistage voltage multiplier according to one embodiment.

FIG. 9 illustrates a voltage multiplication envelope detector 900 for one lobe of an antenna according to one embodiment. As shown, the voltage multiplication envelope detector 900 includes two paths, one coupled to the positive antenna input (ANT1P) 902, and a second path coupled to the negative antenna input (ANT1N) 904. Each path includes a series of diodes 905 and capacitors 907 arranged in such a way to create a pushing effect that amplifies the signals. The positive and negative paths are symmetrical, except for the polarity of the diodes. A feedback loop with a resistor 906 connects the positive antenna output (OUT1P) 908 to the voltage input (Vbs) 910 to provide low pass filtering. Similarly, a second feedback loop with a resistor 912 connects the negative antenna output (OUT1N) 914 to the voltage input 910. The differential effects are differential between A and B, as well as fully differential for A and B alone. The signals are summed, not averaged.

Figure 10:
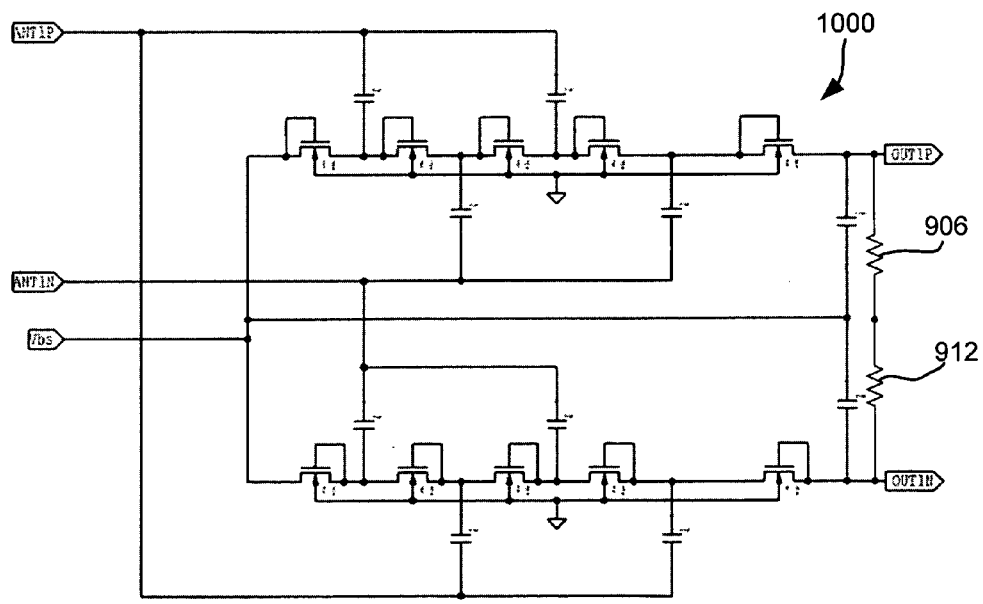
FIG. 10 illustrates a multistage voltage multiplier according to another embodiment.

FIG. 10 illustrates a voltage multiplication envelope detector 1000 for one lobe of an antenna according to one embodiment. This circuit 1000 is almost identical to the circuit 900 of FIG. 9, except for the MOS transistors are used instead of diodes.

Accordingly, using the circuit 800 of FIG. 8 in conjunction with the circuit 600 of FIG. 6, a gain of 24 dB can be achieved prior to the signal entering the preamplifier. This is desirable, as the stronger the signal coming into the preamplifer, the less the effects of any noise in the signal. Then the amplifier can enhance the signal to any desired level. This also greatly improves the sensitivity of the tag implementing the circuit, effectively adding 4× to the tag's range.

Note that the circuits found shown in FIGS. 6-8 show inputs from two and four lobes of the antenna, respectively. One skilled in the art will appreciate that portions of the circuit can be replicated, removed, or otherwise modified to accommodate a higher or lower number of lobes. Likewise, the circuits in FIGS. 6-10 can function with a non-omnidirectional antenna with as few as two lobes.

Referring again to FIG. 3, it can be seen that the circuit 304 is positioned over a physical area of a portion of the antenna, e.g., one or more of the lobes. The antenna acts a virtual ground plane for the circuit. By locating the electronic components of the circuit 304 within the physical area of the antenna (virtual ground plane—positioned within another layer of the substrate 302), undesired interactions with the antenna's electromagnetic fields are successfully avoided. This is because the circuitry resides over and is integrated with an area of the antenna lobe itself, but operates at a much lower frequency than the antenna, and therefore is essentially ignored by the antenna. The circuit likewise essentially ignores the high frequency signal generated by the antenna. The antenna 306 thus "sees" only the virtual ground plane, and therefore is substantially unmodified by the presence of the circuitry. Note that the benefit provided by this design will work with many antenna designs, including but not limited to those presented above.

In one embodiment, the circuit 304 is integrated with one or more of the lobes of the antenna 306, allowing it to use the lobe(s) as the ground plane of the circuit 304. For example, the embodiment shown in FIG. 3 has components positioned on two different lobes. In another embodiment, multiple components of the circuit are positioned on the same lobe, as in FIG. 4. As mentioned previously, it is desirable to have a constant voltage or potential across the ground plane. At high carrier frequency, even though the circuitry may be on the same lobe 308, the inductance effects across the lobe 308 can create differences in the instantaneous voltages across the lobe 308, which can result in abnormal circuit functions. Thus, the antenna 306 is preferably designed such that a voltage or potential of the ground plane of the antenna 306 varies only slightly thereacross, e.g., within ±10% of the average potential or voltage and/or e.g., less than 100 millivolts. This approach also relies on minimizing the circuit interactions between the RF circuitry and the baseband circuitry. The antenna shapes shown in FIGS. 3-5 provide lobes 308 each having about the same voltage potential thereacross due to the shorter and wider antenna design, allowing them to be treated as a constant ground plane. This is because the shorter and wider lobes 308, each having minimal inductance within the node, create a more uniform voltage potential even at 900 MHz.

If the antenna 306 has multiple lobes 308, the circuit 304 can be positioned entirely over the one of the lobes 308, or to a lesser extent, e.g., ≧50%, ≧75%, ≧90%, etc. of the circuit 304 being positioned over a physical area of one of the lobes 308. The remaining portions of the circuit and/or additional components (e.g., battery) can be positioned over another lobe, or on the supporting substrate. Division of various parts of the circuit 304 may be required in order to fit all of the components over the virtual ground plane created by the antenna 306. For instance, if battery power is to be provided to the circuit 304, the battery 312, because of its larger size, may be positioned over a second lobe.

In a variation, the antenna can include what is conventionally known as a ground plane. The circuit can then use this as its ground plane rather than the antenna itself. By locating the electronic components of the receiver within the physical area of the antenna ground plane, undesired interactions with the antenna's electromagnetic fields are also successfully avoided. This is because the circuitry resides over an area of the antenna ground plane, from which the electromagnetic waves are launched and absorbed by the antenna structure, and thus "see" only the ground plane structure, and therefore are substantially unmodified by the presence of the circuitry.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A radio frequency circuit for summing signals from multiple lobes of an antenna, comprising:
   circuitry for converting RF signals from lobes of an antenna to baseband signals; and
   circuitry for summing the baseband signals from the lobes of the antenna prior to conversion of the baseband signals to digital signals wherein the circuitry for summing the baseband signals from each lobe further comprises a feedback loop for feeding back a signal from an output of an adder to an input of the adder.

2. A circuit as recited in claim 1, wherein the circuitry for summing the baseband signals from each lobe further comprises an adder.

3. A circuit as recited in claim 2, wherein the signals are input to a negative pole of an amplifier circuit.

4. A circuit as recited in claim 1, wherein the feedback loop includes at least one of a capacitor and a resistor.

5. A circuit as recited in claim 1, wherein the feedback loop includes a capacitor, a resistor, and a pair of back to back diodes.

6. A circuit as recited in claim 1, further comprising band pass filtering circuitry.

7. A circuit as recited in claim 1, wherein the circuit is implemented in a radio frequency identification tag.

8. A circuit, comprising:
   circuitry for converting RF signals from lobes of an antenna to baseband signals; and
   circuitry for summing the baseband signals from the lobes of the antenna,
   wherein the circuitry for summing the baseband signals from each lobe further comprises an adder,
   wherein the circuitry for summing the baseband signals from each lobe further comprises a feedback loop for feeding back a signal from an output of the adder to an input of the adder,
   wherein the feedback loop includes at least one of a capacitor and a resistor.

9. A circuit, comprising:
   circuitry for converting RF signals from lobes of an antenna to baseband signals; and
   circuitry for summing the baseband signals from the lobes of the antenna,
   wherein the circuitry for summing the baseband signals from each lobe further comprises an adder,
   wherein the circuitry for converting RF signals from lobes of an antenna to baseband signals further comprises circuitry for creating a differential output from the RF signals from the lobes of the antenna, the circuitry combining positive signals from the lobes in one path, the circuit combining negative signals from the lobes in another path.

10. A circuit as recited in claim 9, further comprising a multistage multiplier for enhancing the RF signals from the lobes of the antenna, wherein the circuitry for summing the baseband signals from the lobes of the antenna sums the baseband signals prior to conversion of the baseband signals to digital signals.

11. A circuit as recited in claim 10, wherein the multistage multiplier includes several voltage multipliers, one voltage multiplier being associated with each lobe of the antenna, wherein a voltage multiplier is coupled to the positive and negative inputs from the associated lobe of the antenna.

12. A circuit as recited in claim 11, wherein the circuit is implemented in a radio frequency identification tag.

13. A radio frequency circuit for summing signals from multiple lobes of an antenna, comprising:

circuitry for converting RF signals from lobes of an antenna to analog baseband signals;

circuitry for creating a differential output from the RF signals from the lobes of the antenna, the circuitry combining positive signals from the lobes in one path, the circuit combining negative signals from the lobes in another path; and circuitry for summing the analog baseband signals from each lobe of the antenna;

wherein the circuitry for summing the baseband signals from each lobe further comprises an adder, the baseband signals being input into the adder.

14. A circuit as recited in claim 13, further comprising a multistage multiplier for enhancing the RF signals from the lobes of the antenna, the multistage multiplier including several voltage multipliers, one voltage multiplier being associated with each lobe of the antenna, wherein a voltage multiplier is coupled to the positive and negative inputs from the associated lobe of the antenna.

15. A circuit as recited in claim 13, further comprising band pass filtering circuitry.

16. A circuit as recited in claim 13, wherein the circuit is implemented in a radio frequency identification tag.

17. A radio frequency circuit for summing signals from multiple lobes of an antenna, comprising:

circuitry for converting RF signals from lobes of an antenna to analog baseband signals, wherein the circuitry for converting RF signals from lobes of an antenna to analog baseband signals further comprises circuitry for creating a differential output from the RF signals from the lobes of the antenna, the circuitry combining positive signals from the lobes in one path, the circuit combining negative signals from the lobes in another path wherein the circuitry for summing the baseband signals from each lobe further comprises a feedback loop for feeding back a signal from an output of an adder to an input of the adder.

* * * * *